United States Patent [19]
Sugiyama

[11] Patent Number: 5,251,307
[45] Date of Patent: Oct. 5, 1993

[54] CHANNEL APPARATUS WITH A FUNCTION FOR CONVERTING VIRTUAL ADDRESS TO REAL ADDRESS

[75] Inventor: Takashi Sugiyama, Tokyo, Japan

[73] Assignee: Kabushiki Kaisha Toshiba, Kawasaki, Japan

[21] Appl. No.: 389,270

[22] Filed: Jul. 21, 1989

[30] Foreign Application Priority Data

Jul. 26, 1988 [JP] Japan ................. 63-184704

[51] Int. Cl.⁵ .................... I06F 12/10; I06F 13/28
[52] U.S. Cl. .................... 395/400; 364/242.3; 364/254.2; 364/256.4; 364/251.3; 364/942.7; 364/955.5; 364/957.5; 364/960.2; 364/961.2; 364/DIG. 1; 395/425
[58] Field of Search ... 364/200 MS File, 900 MS File; 395/425, 400, 425

[56] References Cited

U.S. PATENT DOCUMENTS

| | | | |
|---|---|---|---|
| 4,164,041 | 8/1979 | Hartwell et al. | 365/238 |
| 4,373,179 | 2/1983 | Katsumata | 364/200 |
| 4,374,410 | 2/1983 | Sakai et al. | 364/200 |
| 4,413,327 | 11/1983 | Sabo et al. | 364/900 |
| 4,419,728 | 12/1983 | Larson | 364/200 |
| 4,453,230 | 6/1984 | Mizoguchi et al. | 364/900 |
| 4,680,700 | 7/1987 | Hester et al. | 364/200 |
| 4,797,812 | 1/1989 | Kihara | 364/200 |
| 4,996,687 | 2/1991 | Hess et al. | 371/10.1 |

Primary Examiner—Parshotam S. Lall
Assistant Examiner—Ken S. Kim
Attorney, Agent, or Firm—Cushman, Darby & Cushman

[57] ABSTRACT

A portion of a real page address for address conversion and a remaining portion thereof are stored in predetermined areas of first and second memories for storing a control program and control data for controlling a channel apparatus. In order to control the channel apparatus, the first and second memories are independently accessed. In order to generate a DMA address, the first and second memories are simultaneously accessed, and data read out from the first and second memories are linked together to generate a real page address of an DMA-access objective area.

15 Claims, 4 Drawing Sheets

CHANNEL APPARATUS WITH A FUNCTION FOR CONVERTING VIRTUAL ADDRESS TO REAL ADDRESS

BACKGROUND OF THE INVENTION

Field of the Invention

The present invention relates to a channel apparatus for performing DMA (direct memory access) while dynamically switching real addresses on the basis of a transfer start address instructed by a host CPU and an address conversion method in the channel apparatus.

Description of the Related Art

A channel apparatus arranged in an information processing system of a virtual storage scheme normally has an address conversion mechanism. The address conversion mechanism comprises a table memory for storing real page addresses of a main memory. A data length of a real address of the main memory is larger than that of normal data. For this reason, the table memory is exclusive from other memories.

The channel apparatus uses the table memory as an address conversion table, and performs DMA transfer while switching real addresses. However, when the address conversion mechanism is provided to the channel apparatus, power consumption of the channel apparatus is increased, and a board area is also increased, resulting in a bulky channel apparatus. Therefore, the channel apparatus in the virtual storage type system includes a larger number of hardware elements than a channel apparatus in a system which does not employ the virtual storage scheme.

SUMMARY OF THE INVENTION

It is an object of the present invention to provide a channel apparatus which comprises an address conversion mechanism constituted by a smaller number of hardware elements than a conventional system and to provide an address conversion method executed by the channel apparatus.

It is another object of the present invention to realize an address conversion mechanism by only adding a small number of hardware elements to a channel apparatus in a system which does not employ a virtual storage scheme.

In order to achieve the above objects of the present invention, there is provided a channel apparatus for performing DMA transfer while dynamically switching real addresses, comprising:

first memory means (11) having a predetermined area in which a portion of a real page address for address conversion is stored;

second memory means (12) having a predetermined area in which a remaining portion of the real page address for address conversion is stored;

means (27) for independently accessing the first and second memory means; and real address generating means (14, 15, 16) for simultaneously accessing the first and second memory means and linking data read out from the first and second memory means to generate a real address of a DMA-access objective area.

In order to achieve the above objects, an address conversion method according to the present invention comprises the steps of:

storing real page addresses for converting virtual addresses into real addresses in first and second memories, a portion of each real address and a remaining portion thereof are stored at those memory locations of the first and second memories which are accessible by the same address; and sequentially linking the data that is out from the identical address positions of the first and second memories to generate a real address as a DMA-access object.

With the above arrangement, according to the channel apparatus and the address conversion method of the present invention, real address data having a larger data larger than data constituting a control program or other data length can be stored in and read out from a portion of a memory used for storing programs. Therefore, the portion of a conventional memory for controlling the control program can be used as an address conversion table, and the number of hardware elements can be reduced as compared to a conventional system.

DETAILED DESCRIPTION OF THE PREFERRED EMBODIMENTS

Figure 1:
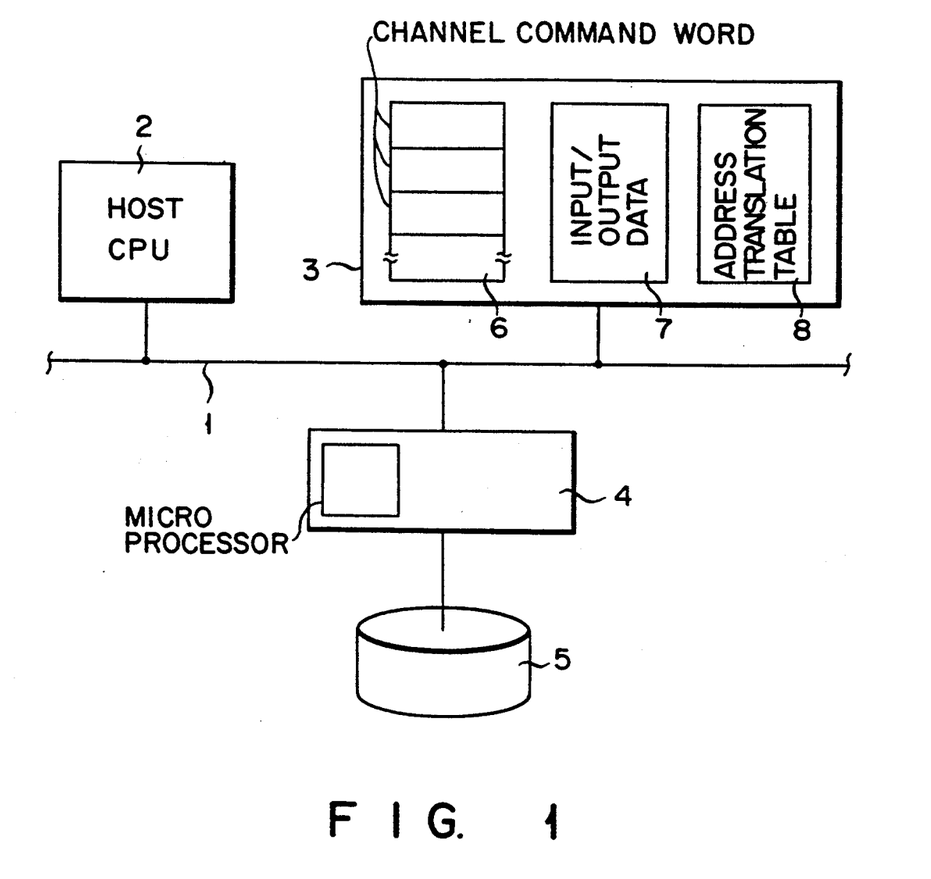
FIG. 1 is a block diagram showing the overall arrangement of an information processing system according to an embodiment of the present invention.

A channel apparatus according to an embodiment of the present invention will be described below with reference to the accompanying drawings. FIG. 1 shows the overall arrangement of an information processing system according to this embodiment.

In the system shown in FIG. 1, a host CPU 2, a main memory 3, and a channel apparatus 4 are connected to a host bus 1. An I/O device 5 is connected to the channel apparatus 4. In FIG. 1, the I/O device 5 comprises a disk device.

The main memory 3 comprises a program storage section 6, an I/O data storage section 7, and an address conversion table 8.

Upon execution of DMA transfer, data stored in the disk device 5 is transferred to the I/O data storage section 7, and data held in the I/O data storage section 7 is transferred to the disk device 5.

Figure 2:
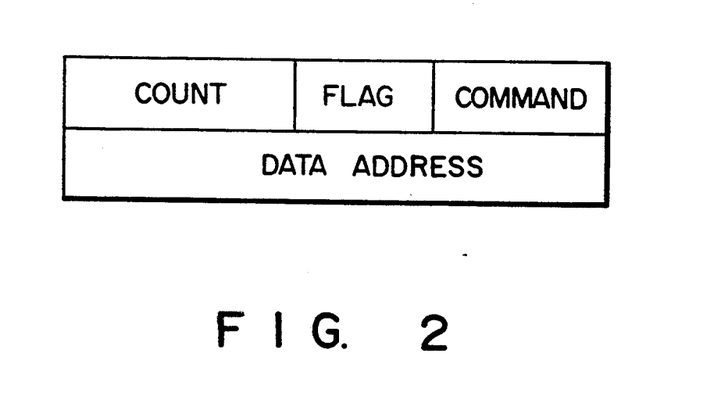
FIG. 2 shows a format of each channel command word shown in FIG. 1.

Each of CCW's (channel command words) stored in the channel program storage section 6 is constituted by, for instance, count data, a flag, a command, or a data address, as shown in FIG. 2. For example, when the disk device 5 is read, the following command string is used: set channel DAT information, branch to virtual command, seek command, and read command.

to illustrate execution, a case will be examined below wherein the channel apparatus 4 performs DMA of the disk device 5. In this case, the host CPU 2 sends start I/O to the channel apparatus 4. In response to the start I/O, the channel apparatus 4 reads out the first CCW from the channel program storage section. The channel apparatus 4 receives stored channel DAT information in the CCW, and transfers a portion of the content stored in the address conversion table 8 (the content starting from a position indicated by a data address and having a length indicated by count data) to its own internal memory. The channel apparatus 4 reads out the next CCW, and recognizes on the basis of a branch to virtual command in the CCW that the following address is a virtual address. The channel apparatus 4 reads the next CCW, and detects a seek command in the CCW. The channel apparatus 4 seeks the head of the disk device 5 on the basis of a seek parameter in the CCW. The channel apparatus 4 reads the next CCW, and reads out data starting from a position indicated by a data address included in the CCW and having an amount indicated by the count data included in the response to disk device in response to a read command from the CCW.

The detailed arrangement of the channel apparatus in the above-mentioned system will be described below with reference to FIG. 3. Memories 11 and 12 comprise RAMs of, for example, 321 Kwords (1 word=2 bytes). Each of the memories 11 and 12 defines an address space from an address "0" to an address $FFFF_H$ (a suffix "H" indicates hexadecimal notation). In general, an arbitrary address in the address space of this size is designated by 16-bit address data. However, in the memories 11 and 12, since one word is constituted by two bytes, an arbitrary address is designated by address data with 15 bits starting from A1 (LSB) to A15 (MSB). As shown in FIG. 4, an area from an address "0" to an address "FFBF" of each of the memories 11 and 12 is mainly used to store a control program, data, and other information necessary for controlling a channel of a microprocessor. On the other hand, a $2^5$ word (64-byte) area from an address "$FFCO_H$" to "$FFFF_H$" (end address) is used as an address conversion table area 11a (or 12a) for setting a real page address for address conversion.

The address input terminals of the memories 11 and 12 are commonly connected to a 15-bit address bus 13. The data I/O terminal of the memory 11 is connected to a 16-bit data bus 14. The data I/O terminal of the memory 12 is connected to a 16-bit data bus 15. A switch circuit 16 for controlling connection/disconnection of the data buses 14 and 15 in response to a signal DMA ACK is connected between the data buses 14 and 15. The signal DMA ACK goes to active level in a DMA address generating cycle for generating a DMA address necessary for DMA transfer. The signal DMA ACK is a response signal from a microprocessor, which indicates that a microprocessor 27 is set in a hold state to generate a DMA address in response to a DMA request from a DMA circuit 30. The switch circuit 16 comprises, e.g., a transceiver (Switch Circuit).

A counter 17 is a 16-bit counter for counting a DMA address in response to the signal DMA ACK. Upper 5 bits of data output from the counter 17 are used to indicate words (entries in the conversion tables) in the conversion table areas 11a and 12a of the memories 11 and 12. Lower 11 bits of the data output from the counter 17 are used to indicate an intrapage offset value.

The signal DMA ACK is supplied to latches 19, 20, and 21 through an inverter 18. The latch 19 latches 16-bit data on the data bus 14 in response to an output signal from the inverter 18. The latch 20 latches 16-bit data on the data bus 15 in response to the output signal from the inverter 18. The latch 21 latches lower 11-bit data of the output data from the counter 17 in response to the output signal from the inverter 18.

An OR gate 22 ORs the signal DMA ACK and a selection signal CS0 which goes to active level when the microprocessor 27 accesses the memory 11, and outputs its output signal to an enable terminal CE of the memory 11. An OR gate 23 ORs the signal DMA ACK and a selection signal CS1 which goes to active level when the microprocessor 27 accesses the memory 12, and its output signal enables terminal CE of the memory 12.

When the signal DMA ACK is at non-active level, a driver 25 is turned on and outputs addresses A1 to A15 from an address latch 29 onto the address bus 13. When the signal DMA ACK is at active level, a driver 26 is turned on and outputs upper 5 bits of the output data from the counter 17 as addresses A1 (corresponding to a 12th bit of the output data of the counter 17) to A5 (corresponding to the MSB of the output data of the counter 17) onto the address bus 13. Of addresses supplied to the driver 26, addresses A6 to A15 are all fixed to a power supply voltage VCC (all logic "1"s).

The microprocessor 27 is connected to the system bus 1. The microprocessor 27 is connected to an address-/data common bus 28. The common bus 28 is connected to the driver 25 through the address latch 29. The common bus 28 is also connected to the data buses 14 and 15. Note that the address latch 29 latches address data as an output signal from the microprocessor 27 in response to an instruction from the microprocessor 27. The address latch 29 decodes the latched data, and outputs the chip selection signals 0 and 1.

The DMA circuit 30 executes a DMA operation. The DMA circuit 30 is operated in every DMA cycle of the host system, outputs a DMA request to the microprocessor, and is then set in a standby state. In response to the DMA request, the microprocessor 27 outputs the signal DMA ACK to the DMA circuit 30, and is then set in a standby state. The DMA circuit 30 executes the DMA operation with respect to a DMA address generated in response to the signal DMA ACK. Only one of the microprocessor 27 and the DMA circuit 30 is operated at a time.

The operation of the arrangement shown in FIG. 3 will be described below.

The host CPU 2 sends a DMA transfer instruction to the microprocessor 27. The microprocessor 27 reads a CCW from the channel program storage section 6. The microprocessor 27 calculates real page (real page in the main memory or real page in the disk device 5) addresses corresponding to continuous pages starting from a virtual page corresponding to a transfer start virtual address instructed by the host CPU. Each real page address has 21 bits. The microprocessor 27 sequentially stores upper 5 bits of each calculated real page address (upper 16 bits of data obtained by adding "0"s corresponding to 11 bits to the MSB of the calculated real page address) from the start position of the conversion table area 11a of the memory 11. The microprocessor 27 sequentially stores the lower 16 bits of each calculated real page address from the start position of the conversion table area 12a of the memory 12. The storage operation is performed by independently accessing the memories 11 and 12. A method of independently accessing the memories 11 and 12 will be described later.

When DMA transfer is performed between the channel apparatus 4 and the main memory 3, the micorprocessor 27 stores a 16-bit DMA address in counter 17. The 16-bit DMA address is obtained by adding "0"s of 5 bits to the upper side of lower 11 bits (intrapage offset value) of the transfer start virtual address in the counter 17.

In this state, when the DMA circuit 30 outputs a signal DMA REQUEST and a DMA cycle (DMA address generating cycle) is started, the microprocessor 27 stores the signal DMA ACK at active level (high level), and is then in the standby state. Upon reception of the signal DMA ACK at active level, the counter 17 is in an output state. Thus, upper 5 bits of the output of the counter 17 are supplied to the driver 26. When the signal DMA ACK goes to active level, the driver 26 is in the output state and outputs 16-bit addresses A1 to A15 including 10 bits of all logic "1"s as bits A6 to A15 onto the address bus 13.

When the signal DMA ACK goes to active level, the OR gates 22 and 23 output the signals at active level to the enable terminals CE of the memories 11 and 12. As a result, the memories 11 and 12 are accessed by the addresses A1 to A15 output onto the address bus 13 by the driver 26. In this case, since the bits A6 to A15 of the addresses A1 to A15 are all "1"s, and bits A1 to A5 are all "0"s, the conversion table areas 11a and 12a of the memories 11 and 12 are designated, and a real page address set at word positions (conversion table entries) of the areas 11a and 12a designated by addresses A1 to A15 is read out onto the data buses 14 and 15. In this case, an upper address is read out onto the data bus 14, and a lower address is read out onto the data bus 15. The signal DMA ACK is at active level, and the data buses 14 and 15 are electrically disconnected by the transceiver 16. Therefore, the upper address on the data bus 14 does not collide with the lower address on the data bus 15.

The upper address of the real page address on the data bus 14 is latched by the latch 19, the lower address of the real page address on the data bus 15 is latched by the latch 20, and lower 11 bits (intrapage offset value) of the output of the counter 17 are latched by the latch 21 in response to the trailing edge of the signal DMA ACK. In response to the trailing edge of the signal DMA ACK, the count value of the counter 17 is incremented by "1". The DMA circuit 30 performs DMA transfer to the main memory 3 using a DMA address (physical address) constituted by the 21-bit real page address consisting of lower 5 bits of the output of the latch 19, the output (16 bits) of the latch 20 and an intrapage offset value indicated by the output (11 bits) of the latch 21. The above operation is repeated in every DMA cycle. When upper 5 bits of the output of the counter 17 are changed, the address signals A1 to A5 are also changed, and a real page address set at the next word position (the next entry of the conversion table) of the conversion table areas 11a and 12a of the memories 11 and 12 is read out.

An operation for independently accessing the memories 11 and 12 by the microprocessor will be described below. The microprocessor can access the memories 11 and 12 only when the signal DMA ACK is at non-active level. When the signal DMA ACK is at non-active level, the transceiver 16 connects the data buses 14 and 15. In response to the signal DMA ACK at non-active level, the driver 26 is turned off and the driver 25 is turned on. The address latch 29 decodes the latched 16-bit address data. The latch 29 sets the Selection Signal 0 at active level when the memory 11 is to be accessed, and sets the Selection Signal 1 at active level when the memory 12 is to be accessed. The driver 25 is turned on, and address data A1 to A15 from the microprocessor 27 are output onto the address bus 13. As a result of the memories 11 and 12, the storage area of the memory which is in an access enable state is accessed by the addresses A1 to A15 on the address bus 13. In a read access mode, the data at the accessed address positions are read out onto the data bus 14 or 15, and in a write access mode, write data on the data bus 14 or 15 are written at the address positions. In this case, the data buses 14 and 15 are connected to each other by the transceiver 16, and a read/write register is connected to one of the data bus 14 and 15. Thus, the memories 11 and 12 can be accessed by the microprocessor 27.

As described above, according to this embodiment, a portion of a memory used by a microprocessor for controlling a channel can be used as an address conversion table. A real page address (21 bits) longer than a word length (16 bits) of the memory can be set in the address conversion table. Therefore, as compared to a conventional system using a memory exclusive for an address conversion table, the number of hardware elements can be decreased, power consumption can be decreased, the apparatus can be made compact, and cost can be reduced.

Figure 5:
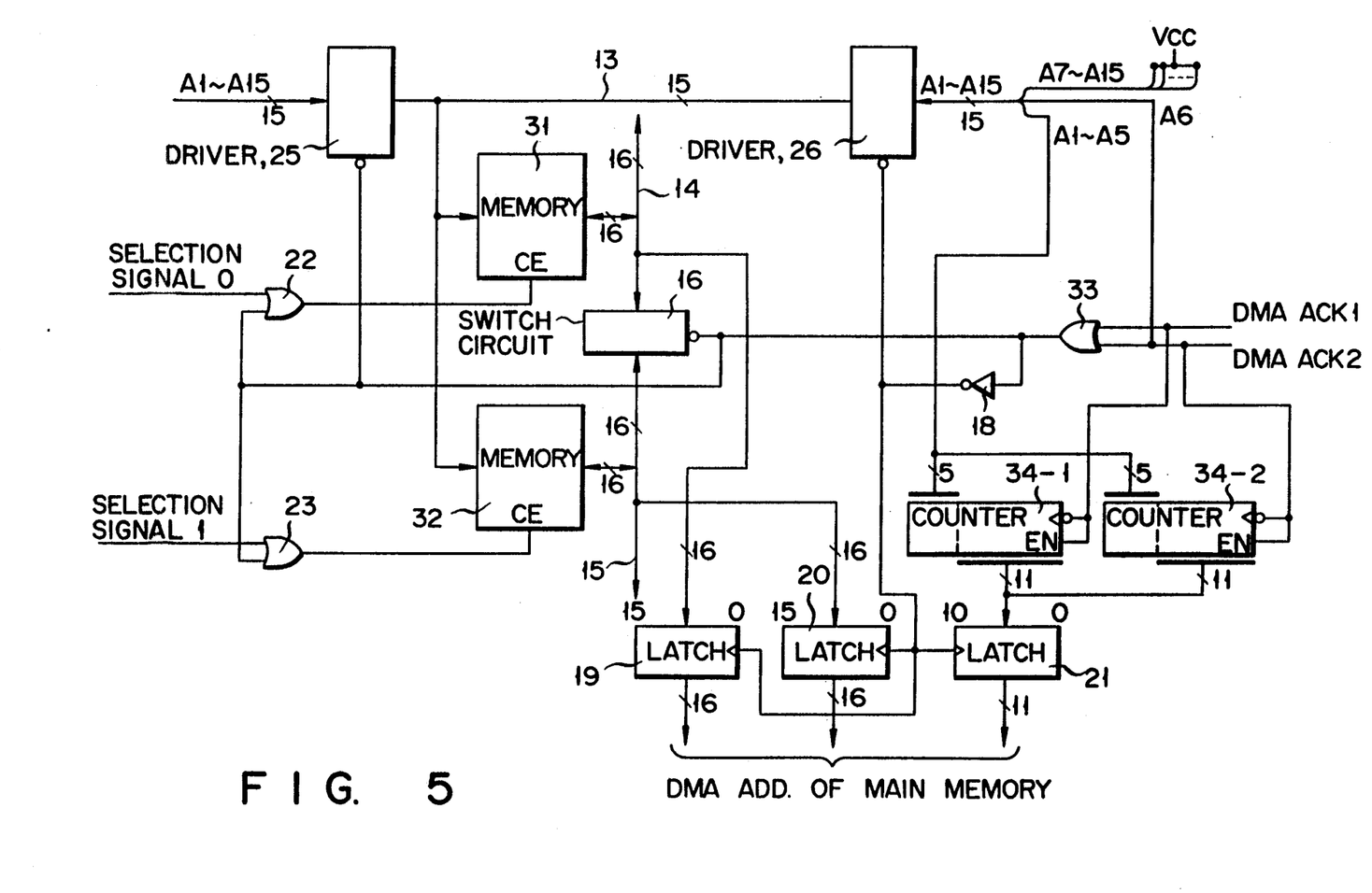
FIG. 5 is a circuit diagram showing an arrangement of a channel apparatus according to a second embodiment of the present invention.

In the above description, a case has been exemplified wherein the embodiment of the present invention is applied to the channel apparatus for controlling a channel. The arrangement shown in FIG. 3 can be modified as shown in FIG. 5, so that the present invention can be applied to a channel apparatus for controlling two channels #1 and #2. The same reference numerals in FIG. 5 denote the same parts as in FIG. 3, and a detailed description thereof will be omitted.

Figure 3:
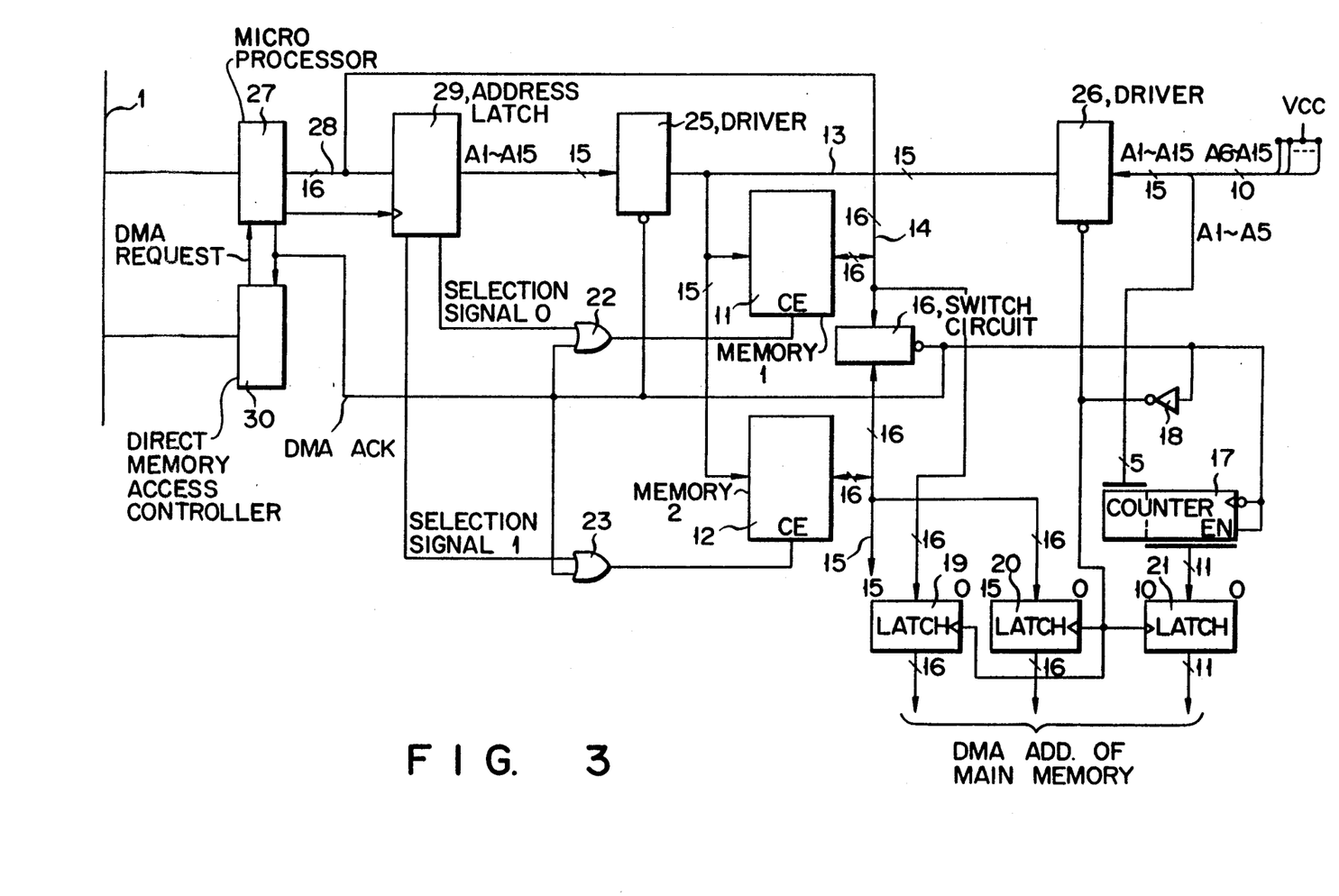
FIG. 3 is a circuit diagram showing an arrangement of a channel apparatus according to a first embodiment of the present invention.
Figure 4:
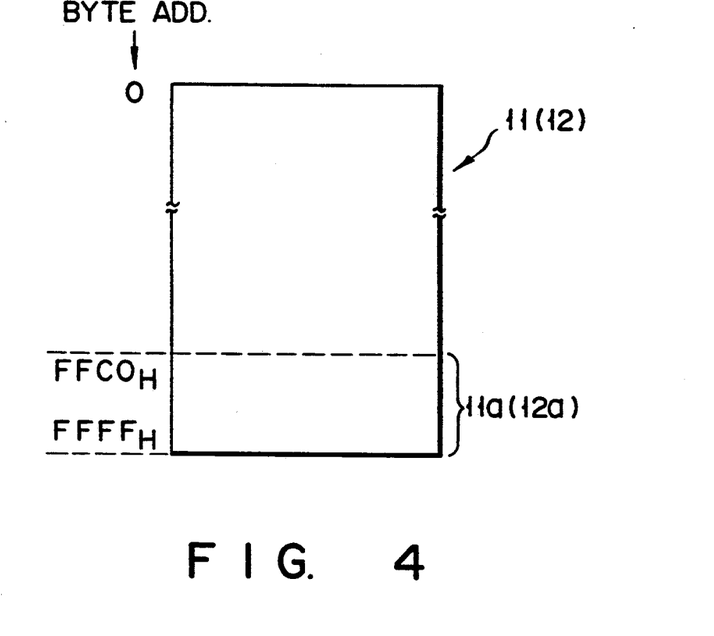
FIG. 4 is a memory map showing a structure of a memory shown in FIG. 3.
Figure 6:
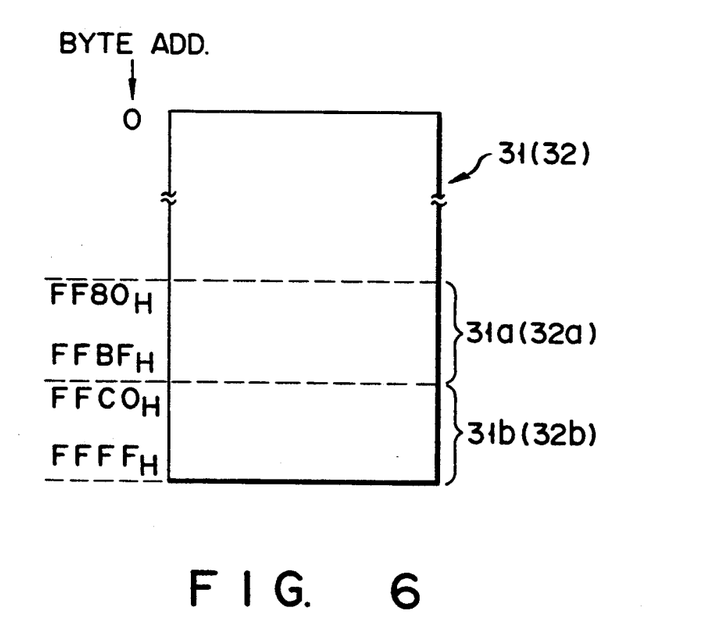
FIG. 6 is a memory map showing a structure of a memory shown in FIG. 5.

In FIG. 5, memories 31 and 32 comprise RAMs of 32 Kwords (1 word=2 bytes) as in the memories 11 and 12 shown in FIG. 3. The memories 31 and 32 mainly store a control program, data, and the like necessary for controlling channels of a microprocessor. In each of the memories 31 and 32, a $2^5$-word (64-byte) area from an address "FF80$_H$" to "FFBF$_H$" is used as an address conversion table area 31a (or 32a) for divisionally setting a real page address for address conversion upon DMA transfer through a channel #1, as shown in FIG. 6. Furthermore, as shown in FIG. 6, a $2^5$-word (64 byte) area from an address "FFC0$_H$" to "FFFF$_H$" are used as an address conversion table area 31b (or 32b) for divisionally setting a real page address for address conversion upon DMA transfer through a channel #2. The divisional setting operation of the real page address in the areas 31a, 32a, 31b, and 32b is performed by independently accessing the memories 31 and 32 as in the first embodiment.

The arrangement shown in FIG. 5 includes an OR gate 33 for O-Ring signals DMA ACK1 and DMA ACK2 which go to active level upon DMA access of the channels #1 and #2, respectively. In the arrangement shown in FIG. 5, counters 34-1 and 34-2 for counting DMA addresses in response to the signals DMA ACK1 and DMA ACK2 are arranged in place of the counter 17 shown in FIG. 3. The counters 34-1 and 34-2 are in an output enable state when the signals DMA ACK1 and DMA ACK2 go to active level. When the signal DMA ACK1 or DMA ACK2 goes to active level, the driver 26 outputs 15-bit address data A1 to A15 including upper 5 bits of the output data from the counter 34-1 or 34-2 as A1 to A5, the signal DMA ACK2 as A6, and 9 bits of all "1"s as A7 to A15 onto an address bus 13.

The bits A7 to A15 of the address data A1 to A15 on the address bus 13 are all "1"s, and the bit A6 is "0" in the case of a DMA cycle for the channel #1 and "1" in the case of a DMA cycle for the channel #2. Therefore, in the DMA cycle for the channel #1, the conversion table areas 31a and 32a of the memories 31 and 32 are designated, and a real page address (upper and lower addresses) stored at word positions (entries in a conversion table) of the areas 31a and 32a designated by the bits A1 to A5, is read out onto the data buses 14 and 15. In contrast to this, in the DMA cycle for the channel #2, a real page address (upper and lower addresses) stored at word positions (entries in a conversion table) of the conversion table areas 31b and 32b of the memories 31 and 32 designated by the bits A1 to A5, is read out onto the data buses 14 and 15. The following operation is the same as that in FIG. 3, except that lower 11 bits of the output from one of the counters 34-1 and 34-2 corresponding to the DMA transfer channel is latched by a latch 21 as an intrapage offset value.

In the above embodiments, areas on the side of the end address of the storage areas of the memories 11, 12, 31, and 32 are used for storing address conversion tables. However, the present invention is not limited to the above embodiments. The address conversion tables may be stored in other storage areas of the memories 11, 12, 31, and 32. In this case, address data supplied to the driver 26 is corrected in correspondence with a storage position. For example, when address conversion tables are stored in starting areas of the storage areas of the memories 11, 12, 31, and 32, addresses A6 to A15 supplied to the driver 26 are "0"s.

The present invention is not limited to the above embodiments, and various changes and modifications may be made within the spirit and scope of the invention.

What is claimed is:

1. A channel apparatus controlling n (n is an integer not less than 1) channels while sequentially updating real addresses in response to a transfer start virtual address and performing DMA (direct memory access) transfer on the basis of said start virtual address, comprising:

processor means for controlling an operation of said channel apparatus;

first memory means for storing B (an integer not less than 2) bits of data at each address position, having n first areas, each corresponding to a respective one of said n channels, each of said first areas having a plurality of storage areas each of which can be addressed by an address signal and stores data;

second memory means for storing B bits of data at each address position, having n second areas, each of which is set aside for each for said n channels, each of said second areas having a plurality of storage areas, each of which can be addressed by the address signal and stores data, a portion of a given real page address having C bits (C is an integer greater than B) and a remaining portion of said given real page address being stored in those storage area of said first and second areas which can be addressed by the same address, data other than said real page address being stored in areas other than said first and second areas of said first and second memory means;

enabling means for enabling one of said first and second memory means in response to an address output from said processor means in a normal state, and for enabling both of said first and second memory means in response to a signal from said data processor means in a DMA address generating cycle for DMA transfer;

address bus means, for transferring address data, said address bus means being commonly connected to said first and second memory means;

first data bus means for transferring data, said first data bus means being connected to said first memory means;

second data bus means for transferring data, said second data bus means being connected to said second memory means;

switch means for connecting said first and second data bus means and said processor means in a normal state and for preventing collision of data on said first and second bus means in the DMA address generating cycle for DMA transfer;

at least n counter means each for performing a count operation in every DMA address generating cycle for DMA tranfer of the corresponding channel;

driver means for, when said processor means accesses said first and second memory means in the normal state, outputting an address from said processor means onto said address bus means, thereby said processor means both reading and writing data to or from the other portion of one of said memory means enabled by said enabling means through said data bus means, and for, in the DMA address generating cycle, outputting an address obtained by adding a value specific to the corresponding channel to predetermined upper bits of an output from said counter means for the corresponding channel onto said address bus means; and means for combining to one address said bits of data read out onto said first and second data bus means from said first and second memory means in the DMA address generating cycle to generate a real page address of a page.

2. An apparatus according to claim 1, wherein said driver means comprises first driver means for receiving address data from said processor means, second driver means for outputting the address obtained by adding the specific value to the predetermined upper bits of the output from the corresponding counter means onto said address bus means, and means for causing only one of said first and second driver means to output data.

3. An apparatus according to claim 1, further comprising means for holding output data from said first memory means, output data from said second memory means, and bits other than the predetermined upper bits of the output data of the counter means.

4. An apparatus according to claim 1, further comprising means for DMA-accessing a storage area designated by the real page address.

5. An apparatus according to claim 4, wherein said execution means outputs a DMA request to said processor means in every DMA cycle of a host system, said processor means outputs a response signal in response to the DMA request, and said driver means is controlled in response to the response signal.

6. An apparatus according to claim 1, wherein said apparatus is adapted for connection to a host system comprising: a host processor; a main memory; a system bus for connecting said host processor, said main memory, and said channel apparatus; and an input/output device.

7. A real address generating circuit for DMA (direct memory access) transfer, comprising:
a DMA controller for requesting said DMA transfer;
processor means for receiving said DMA transfer request and outputting a DMA acknowledge signal to said DMA controller;
a first memory having first and second address areas for storing data other than address data at each address position in said first address area;
a second memory having first and second address areas for storing data other than address data at each address position in said first address area;
each real page address for said DMA transfer being divided into two parts and being stored at address positions in said second address areas of said first and second memories which can be addressed by the same address, a bit length of said real page address being greater than that of said each address position of said first and second memories, said processor means outputting an address of said first and second memories to access said first and second memories;
selecting means, coupling to said processor means and said first and second memories, for enabling one of said first and second memories in response to an address output from said processor means in a normal state and for enabling both of said first and second memories in response to said DMA acknowledge signal from said processor means in a DMA address generating cycle for DMA transfer;
driver means, coupled to said processor means and said first and second memories,
for supplying an address from said processor means to said first and second memories when said processor means reads said first address area of one of said first and second memories to read out data from said first address area of said one of said first and second memory enabled by said selecting means,
for supplying an address from said processor means to said first and second memories when said processor means writes data in said first address area of one of said first and second memories and supplying write data from said processor means to said first and second memories to write data in said first address area of one of said first and second memory enabled by said selecting means, and
for, during said DMA address generating cycle, responding to said DMA acknowledge signal by supplying an address specifying said second address area to said first and second memories to read out data from said second address areas of said first and second memories enabled by said selecting means and linking data read out from said first and second memories to generate a real page address for said DMA transfer.

8. A channel apparatus for performing DMA transfer while sequentially updating real addresses, comprising:
a first memory means for storing a portion of a real page address for address conversion in a first predetermined area and storing data other than said real page address in a second predetermined area;
a second memory means for storing a remaining portion of said real page address in a first predetermined area and storing data other than said real page address in a second predetermined area;
means for independently accessing said first and second memory means as well as accessing said second predetermined areas of said first and second memory means; and
real address generating means for simultaneously accessing said first predetermined areas of said first and second memory means and combining to one address said portions read out from said first and second memory means to generate a real address of a DMA-access objective area,
said independently accessing means and said real address generating means together being constituted by:
processor means for controlling an operation of said channel apparatus;
address bus mean for transferring address data, said address bus means being commonly connected to said first and second memory means;
a first data bus means for transferring data, said first data bus means being connected to said first memory means;
a second data bus means for transferring data, said second data bus means being connected to said second memory means;
means for connecting said first and second data bus means in a normal state and preventing collision of data on said first and second data bus means in a DMA address generating cycle for DMA transfer;
counter means, arranged in correspondence with the number of channels controlled by said channel apparatus, for performing a count operation in every said DMA address generating cycle for DMA transfer of a corresponding channel; and
driver means for, when said processor means accesses said first or second memory means, outputting an address from said processor means onto said address bus means and for, in said DMA address generating cycle, outputting an address obtained by adding a value inherent to the corresponding channel to predetermined upper bits of an output from said counter means for the corresponding channel onto said address bus means.

9. An apparatus according to claim 8, wherein the real address generated by said real address generating means is longer than a word length of data held in said first and second memory means.

10. An apparatus according to claim 8, wherein a program and data for controlling said channel apparatus are stored in areas other than the predetermined areas of said first and second memory means.

11. An apparatus according to claim 8, wherein the real address generated by said real address generating means is a page address, said channel apparatus comprises means for outputting a real address signal and designating an offset position in a page designated by the page address, and means for, when the offset position reaches the end of the page, instructing said real address generating means to update the page address.

12. An apparatus according to claim 8, wherein said drive means comprises first driver means for receiving address data from said processor means, second drive means for outputting the address obtained by adding the specific value to the predetermined upper bits of the output from the corresponding counter means onto said address bus means, and means for causing one of said first and second driver means to output data.

13. An apparatus according to claim 12, further comprising means for holding output data from said first memory means, output data from said second memory means and bits other than the predetermined upper bits of the output data of the counter means.

14. An apparatus according to claim 8, wherein said apparatus is adapted for connection to a host system comprising: a host processor, a main memory; a system bus for connecting said host processor, said main memory, and said channel apparatus; and an input/output device.

15. An apparatus according to claim 8, wherein portions of each real address are held at identical address positions of the first and second areas of said first and second memory means.

* * * * *